(12) United States Patent
Liu et al.

(10) Patent No.: US 12,282,237 B2
(45) Date of Patent: Apr. 22, 2025

(54) DISPLAY DEVICE

(71) Applicant: Wuhan China Star Optoelectronics Technology Co., Ltd., Hubei (CN)

(72) Inventors: Xialing Liu, Hubei (CN); Changwen Ma, Hubei (CN); Zhou Zhang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/034,171

(22) PCT Filed: Apr. 14, 2023

(86) PCT No.: PCT/CN2023/088260
§ 371 (c)(1),
(2) Date: Apr. 27, 2023

(87) PCT Pub. No.: WO2024/197988
PCT Pub. Date: Oct. 3, 2024

(65) Prior Publication Data
US 2024/0329467 A1    Oct. 3, 2024

(30) Foreign Application Priority Data
Mar. 31, 2023   (CN) .......................... 202310350869.8

(51) Int. Cl.
G02F 1/1345    (2006.01)
G02F 1/1333    (2006.01)

(52) U.S. Cl.
CPC .... *G02F 1/13452* (2013.01); *G02F 1/133305* (2013.01)

(58) Field of Classification Search
None
See application file for complete search history.

(56) References Cited

U.S. PATENT DOCUMENTS 10,897,819 B2    1/2021  Wu et al.
11,050,969 B2    6/2021  Lu
(Continued)

FOREIGN PATENT DOCUMENTS

CN    108803164    11/2018
CN    109451660    3/2019
(Continued)

OTHER PUBLICATIONS

International Search Report and the Written Opinion Dated Nov. 29, 2023 From the International Searching Authority Re. Application No. PCT/CN2023/088260 and Its Translation Into English. (16 Pages).

*Primary Examiner* — Dung T Nguyen

(57) ABSTRACT

The present application discloses a display device, the display device includes: a display panel and a printed circuit board. A first bonding region is disposed on the display panel. The first bonding region includes a first bonding terminal. A second bonding region is disposed on the printed circuit board. The second bonding region includes a second bonding terminal. The first bonding terminal is connected to and contacts the second bonding terminal. The display device provided by the present application can reduce a width of a frame of the display device and improve a screen ratio of the display device.

18 Claims, 9 Drawing Sheets

(56) References Cited

U.S. PATENT DOCUMENTS

| | | | |
|---|---|---|---|
| 11,139,362 B2 | 10/2021 | Tsai | |
| 2017/0184903 A1* | 6/2017 | Fujikawa | G02F 1/13458 |
| 2019/0259824 A1* | 8/2019 | Cho | H10K 77/111 |
| 2020/0385862 A1 | 12/2020 | Srivastava et al. | |
| 2021/0043694 A1 | 2/2021 | Wei et al. | |
| 2021/0151541 A1* | 5/2021 | Lim | G02F 1/133512 |
| 2023/0378411 A1 | 11/2023 | Zhu et al. | |

FOREIGN PATENT DOCUMENTS

| | | |
|---|---|---|
| CN | 109493745 | 3/2019 |
| CN | 110221462 | 9/2019 |
| CN | 110322840 | 10/2019 |
| CN | 112180643 | 1/2021 |
| CN | 215453382 | 1/2022 |
| CN | 217035038 | 7/2022 |
| KR | 10-2019-0003199 | 1/2019 |
| TW | I699586 | 7/2020 |
| WO | WO 2022/160203 | 8/2022 |

* cited by examiner

DISPLAY DEVICE

RELATED APPLICATIONS

This application is a National Phase of PCT Patent Application No. PCT/CN2023/088260 having International filing date of Apr. 14, 2023, which claims the benefit of priority of Chinese Patent Application No. 202310350869.8 filed on Mar. 31, 2023. The contents of the above applications are all incorporated by reference as if fully set forth herein in their entirety.

FIELD AND BACKGROUND OF THE INVENTION

The present application relates to a field of display technologies, especially to a display device.

With the rapid development of display technology, display devices such as mobile communication terminals (such as cell phones), mobile computers, and tablets have become indispensable tools in people's lives. In practical applications, the larger the screen ratio of the display device, the better the visual effects and user experience provided to the user.

The so-called screen ratio refers to the ratio of the area of the display region in the display device to the total area of the display panel of the entire display device. The larger the screen ratio, the narrower the border of the electronic apparatus, which can reduce the overall size of the electronic apparatus under the premise of a certain screen area, thus satisfying the portability and better visual effects of the electronic apparatus. How to minimize the width of the border of the display device and increase the screen ratio of the product has become a hot research topic.

Therefore, providing a novel display device to reduce the border width of the display device and improve the screen ratio of the display device is an issue that display device manufacturers urgently need to solve.

SUMMARY OF THE INVENTION

Technical Issue

The present application provides a display device that can reduce a width of a frame of the display device and improve a screen ratio of the display device.

Technical Solution

The present application provides a display device that can reduce a width of a frame of the display device and improve a screen ratio of the display device.

An embodiment of the present application provides a display device, comprising: a display panel, wherein a first bonding region, disposed on the display panel, comprises a first bonding terminal; and a printed circuit board, wherein a second bonding region, disposed on the printed circuit board, comprises a second bonding terminal connected to and contacting the first bonding terminal.

Optionally, in some embodiments of the present application, the display panel comprises a non-display region in which the first bonding region is disposed; the first bonding region further comprises a driver module that is electrically connected to the first bonding terminal, and is configured to receive and process a control signal.

Optionally, in some embodiments of the present application, the driver module comprises a driver chip and a fanout wiring coupled between the driver chip and the first bonding terminal.

Optionally, in some embodiments of the present application, the driver module comprises a first driver chip, a second driver chip, and a first fanout wiring and second fanout wiring; the first fanout wiring is electrically connected between the first driver chip and the first bonding terminal; the second fanout wiring is electrically connected between the second driver chip and the first driver chip.

Optionally, in some embodiments of the present application, in the first bonding region, the display panel comprises a flexible substrate and a driving functional layer thereon; the driving functional layer that is configured to receive and process a control signal and driving functional comprises a thin film transistor and a fanout wiring electrically connected between the thin film transistor and the first bonding terminal.

Optionally, in some embodiments of the present application, the driving functional layer comprises a metal layer and an oxide layer disposed on a side of the metal layer away from the flexible substrate; a plurality of the fanout wirings are disposed on the oxide layer at intervals, orthographic projections of at least some of the fanout wirings on the flexible comprise an overlap, and some of the fanout wirings on the overlap are disposed on the metal layer.

Optionally, in some embodiments of the present application, the display panel comprises a display region and a non-display region disposed adjacently, the first bonding region is disposed in the display region, and/or, and the first bonding region is disposed on the non-display region.

Optionally, in some embodiments of the present application, the first bonding region comprises a plurality of first bonding terminals, and a pitch between adjacent two of the first bonding terminals is greater than or equal to 250 microns.

Optionally, in some embodiments of the present application, the driving functional layer is further configured to generate and process a timing signal and data signal according to the control signal.

Optionally, in some embodiments of the present application, the display device further comprises zero insertion force connector disposed on the flexible substrate, and the display panel is electrically connected to the printed circuit board through the zero insertion force connector.

Optionally, in some embodiments of the present application, the display device further comprises reinforcement patch disposed on the flexible substrate away from the zero insertion force connector, and disposed at on the flexible substrate near the printed circuit board.

The present application also provides a display device, comprising: a display panel, wherein a first bonding region disposed on the display panel comprises a plurality of first bonding terminals, and a pitch between adjacent two of the first bonding terminals is greater than 120 microns; and a printed circuit board, wherein a second bonding region disposed on the printed circuit board comprises a plurality of second bonding terminals connected to and contacting the first bonding terminal.

Optionally, in some embodiments of the present application, the display panel comprises a non-display region in which the first bonding region is disposed; the first bonding region further comprises a driver module that is electrically connected to the first bonding terminal, and is configured to receive and process a control signal.

Optionally, in some embodiments of the present application, the driver module comprises a driver chip and a fanout wiring coupled between the driver chip and the first bonding terminal.

Optionally, in some embodiments of the present application, the driver module comprises a first driver chip, a second driver chip, and a first fanout wiring and second fanout wiring; the first fanout wiring is electrically connected between the first driver chip and the first bonding terminal; the second fanout wiring is electrically connected between the second driver chip and the first driver chip.

Optionally, in some embodiments of the present application, in the first bonding region, the display panel comprises a flexible substrate and a driving functional layer thereon; the driving functional layer that is configured to receive and process a control signal and driving functional comprises a thin film transistor and a fanout wiring electrically connected between the thin film transistor and the first bonding terminal.

Optionally, in some embodiments of the present application, the driving functional layer comprises a metal layer and an oxide layer disposed on a side of the metal layer away from the flexible substrate; a plurality of the fanout wirings are disposed on the oxide layer at intervals, orthographic projections of at least some of the fanout wirings on the flexible comprise an overlap, and some of the fanout wirings on the overlap are disposed on the metal layer.

Optionally, in some embodiments of the present application, the display panel comprises a display region and a non-display region disposed adjacently, the first bonding region is disposed in the display region, and/or, and the first bonding region is disposed on the non-display region.

Optionally, in some embodiments of the present application, the first bonding region comprises a plurality of first bonding terminals, and a pitch between adjacent two of the first bonding terminals is greater than or equal to 250 microns.

Optionally, in some embodiments of the present application, the driving functional layer is further configured to generate and process a timing signal and data signal according to the control signal.

Advantages

The present application provides a display device, the display device comprises: a display panel and a printed circuit board, wherein a first bonding region is disposed on the display panel, the first bonding region comprises a first bonding terminal; a second bonding region is disposed on the printed circuit board, the second bonding region comprises a second bonding terminal, and the first bonding terminal is electrically connected to the second bonding terminal. Compared to the conventional technology requiring a flexible circuit board disposed between a display panel in and a printed circuit board, the display panel and the printed circuit board of the display device provided by the present application are electrically connected through the first bonding terminal and the second bonding terminal, which can reduce a width of a frame of the display device and improve a screen ratio of the display device.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DESCRIPTION OF SPECIFIC EMBODIMENTS OF THE INVENTION

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

An embodiment of the present application provides a display device, the display device can reduce a width of a frame of the display device and improve a screen ratio of the display device, which will be described as follows. It should be explained that the order of descriptions in the following embodiments is not to limit the preferred order of the embodiments. In addition, in the description of the present application, the term "comprising" is to be interpreted as "including but not limited to". The terms "first", "second", "third", etc. are used for identification purposes only, to distinguish between different objects, and not to describe a particular sequence.

Figure 1:
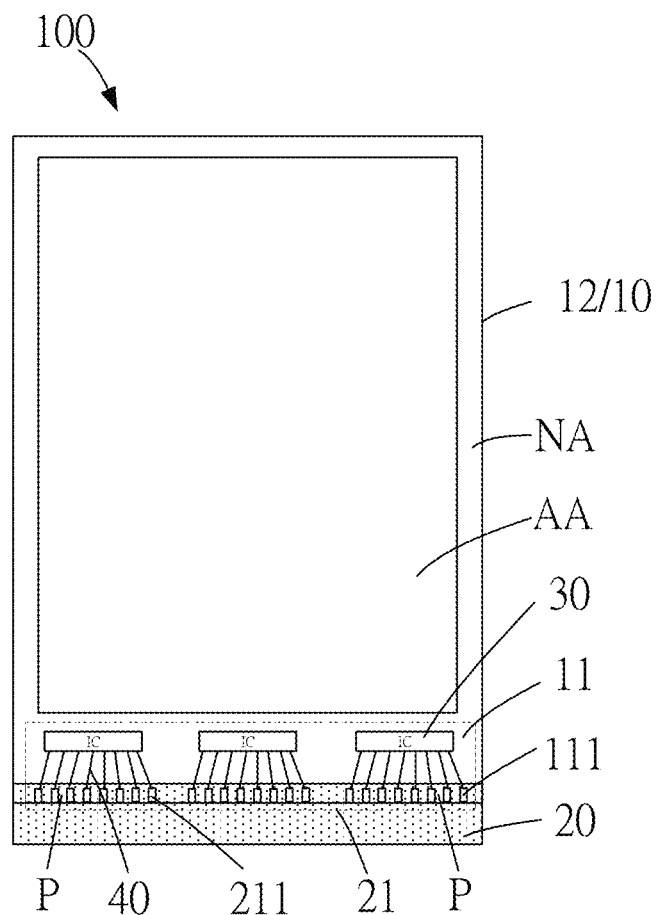
FIG. 1 is a schematic structural view of a display device provided by a first embodiment of the present application.

With reference to FIG. 1, FIG. 1 is a schematic structural view of a display device provided by a first embodiment of the present application. With reference to FIG. 1, the embodiment of the present application provides a display device 100 comprising: a display panel 10 and a printed circuit board 20. A first bonding region 11 is disposed on the display panel 10, and the first bonding region 11 comprises a first bonding terminal 111. A second bonding region 21 is disposed on the printed circuit board 20, and the second bonding region 21 comprises a second bonding terminal 211. The first bonding terminal 111 is connected to and contacts the second bonding terminal 211.

In particular, the first bonding region 11 comprises a plurality of first bonding terminals 111. The second bonding region 21 is disposed on the printed circuit board 20. The second bonding region 21 comprises a plurality of the second bonding terminals 211. The first bonding terminals 111 are connected to and contact the second bonding terminals 211 one by one.

The display panel 10 and the printed circuit board 20 in the display device 100 provided by the present application are connected to and contact each other through the first bonding terminal 111 and the second bonding terminal 211. Compared to the conventional technology requiring a connection part such as a flexible circuit board disposed between the display panel and the printed circuit board 20, the display device provided by the present application can reduce a width of a frame of the display device and improve a screen ratio of the display device.

In the embodiment of the present application, the display panel 10 comprises a non-display region NA, and the first bonding region 11 is disposed in the non-display region NA. The first bonding region 11 further comprises a driver module, and the driver module is electrically connected to the first bonding terminal 111. The driver module is configured to receive a control signal and process and then output the control signal. In particular, the display panel 10 further comprises a display region AA, the display region AA is disposed adjacent to the non-display region NA and the display region AA is configured to display images.

In the embodiment of the present application, the driver module comprises a driver chip 30 and a fanout wiring 40. An end of the fanout wiring 40 is electrically connected to the driver chip 30, and another end of the fanout wiring 40 is electrically connected to the first bonding terminal 111. In particular, the driver module comprises a plurality of the driver chips 30, and the driver chips 30 are electrically connected to the fanout wirings 40 correspondingly.

In the embodiment of the present application, the display panel 10 comprises a flexible substrate 12. Material of the flexible substrate 12 can be transparent polyimide. Transparent polyimide material possesses superior properties, including high heat resistance, high reliability, flexibility, low density, low dielectric constant, and ease of achieving fine pattern circuit processing. Therefore, it can be applied to flexible display technology for foldable screens. These properties allow the material to retain the excellent performance of traditional polyimides.

In the embodiment of the present application, a pitch P between adjacent two of the first bonding terminals 111 is greater than 120 microns. Preferably, the pitch P among a plurality of first bonding terminals 111 ranges from 120 microns to 250 microns. The pitch P comprises a line width and a line distance, and a person of ordinary skill in the art can adjust the line width or line distance according to demands, the present application has no limit to it. Based on the above characteristics of the flexible substrate 12, some of wirings of the flexible circuit board in the conventional technology are designed on the flexible substrate 12, a number of the fanout wirings 40 from the driver chip 30 to the flexible circuit board is reduced. In a range allowed by the resistance, the adjacent multiple fanout wirings 40 electrically connected to an input end lead 31 of the driver chip 30 and transmitting the same signal are adjusted as one to increase the pitch P of the bonding soldering pad in the first bonding region 11 as possible, namely, increasing a fanout pitch among the multiple fanout wirings 40, to match a bonding accuracy of the second bonding terminal 211 on the printed circuit board 20. Conventionally, a bonding accuracy from a flexible circuit board to a glass substrate is generally 120 microns, and a bonding accuracy from the flexible circuit board to the printed circuit board 20 is generally 250 microns. Therefore, after some of the wirings of the flexible circuit board are designed on the flexible substrate 12, a number of the first bonding terminal 111 on the flexible substrate 12 is equal a number of the second bonding terminal 211 on the printed circuit board 20. As such, the number of the first bonding terminal 111 is decreased to be at most half the number of bonding terminals disposed on the glass substrate in the conventional technology. Accordingly, the pitch P among the multiple first bonding terminals 111 is increased to be twice the pitch P among the conventional bonding terminals disposed on the glass substrate.

Figure 2:
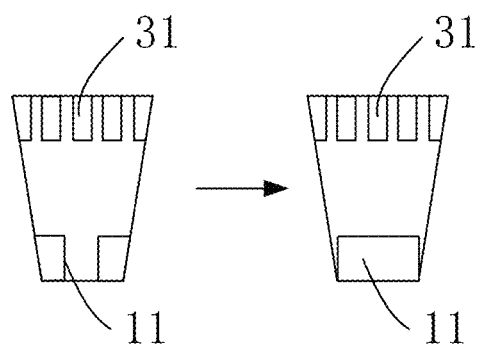
FIG. 2 is a schematic view of a lead and a first bonding terminal of a driver chip provided by the embodiment of the present application.

With reference to FIG. 2, FIG. 2 is a schematic view of a lead and a first bonding terminal of a driver chip provided by the embodiment of the present application. when the pitch P among the first bonding terminals 111 is increased, the bonding resistance of the first bonding terminals 111 is decreased accordingly. For example, a bonding resistance of a bonding terminal disposed on a glass substrate of the conventional technology is 2.5 ohm. Because a width of the bonding soldering pad of the first bonding region 11 in the present application is increased to be twice the width of the conventional technology, the bonding resistance of the first bonding terminal 111 is lowered to 1.25 ohm. With reference to FIG. 2, in the conventional technology, the input end lead 31 of each of six driver chips 30 correspond to two bonding terminals, namely, an end of each of six fanout wirings 40 is electrically connected to the input end lead 31 of each of six driver chips 30, and another end of the six fanout wirings 40 is connected to the two bonding terminals. In the present application. When some of the wirings of the flexible circuit board are designed on the flexible substrate 12, the input end lead 31 of each of six driver chips 30 corresponds to one bonding terminal, namely, an end of each of the six fanout wirings 40 is electrically connected to the input end lead 31 of each of six driver chips 30, another end of the six fanout wirings 40 is electrically connected to one bonding terminal.

Figure 3:
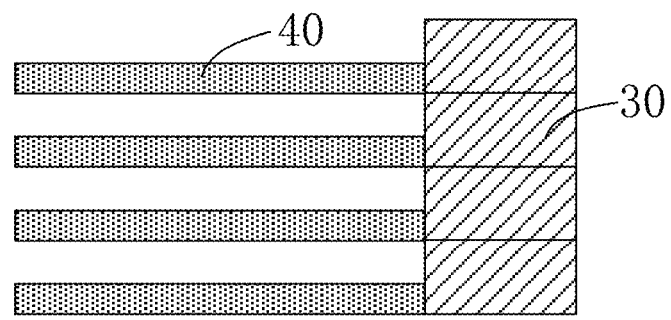
FIG. 3 is a top view of a fanout wiring provided by the first embodiment of the present application.

With reference to FIG. 3, FIG. 3 is a top view of a fanout wiring provided by the first embodiment of the present application. A bonding resistance of the first bonding terminal 111 is low such that the entire resistance variation is only influenced basically by resistance variation of the fanout wirings 40 from the input end lead of the driver chip 30 to the first bonding terminal 111. With reference to FIG. 3, a fanout pitch of the fanout wirings 40 in the present application is wider, and the multiple fanout wirings 40 are spaced without any overlap such that the resistance variation of the fanout wiring 40 from the input end lead of the driver chip 30 to the first bonding terminal 111 is smaller.

Figure 4:
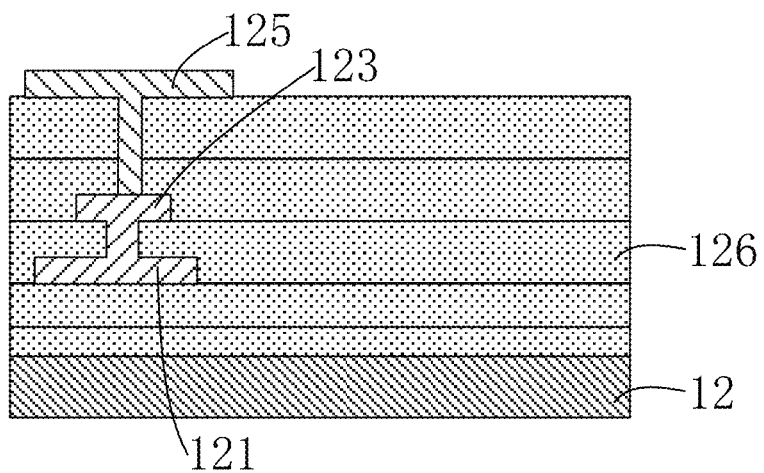
FIG. 4 is a cross-sectional view of a first bonding region in a display panel provided by the first embodiment of the present application.

With reference to FIG. 4, FIG. 4 is a cross-sectional view of a first bonding region in a display panel provided by the first embodiment of the present application. With reference to FIG. 4, in the first bonding region 11, display panel comprises a flexible substrate 12, a first metal layer 121, a second metal layer 123, an oxide layer 125, and an interlayer dielectric layer 126. The fanout wirings 40 are disposed on the second metal layer 123 at intervals. Preferably, the fanout wirings 40 are disposed parallelly. Such design makes less resistance variation of the fanout wirings 40 from the input end lead of the driver chip 30 to the first bonding terminal 111. In particular, in a liquid crystal display product, a bonding soldering pad portion usually comprises the first metal layer 121 (namely, gate electrode layer), the second metal layer 123 (namely, source and drain metal layer), and the oxide layer 125, and the bonding soldering pad portion is connected to some of gold fingers (the second bonding terminal 211) of the printed circuit board 20 through the oxide layer 125 by an anisotropic conductive adhesive film. Alternatively in an application of a submillimeter light emitting diode product, some metal of the bonding soldering pad usually comprises a gate electrode layer, a first source and drain metal layer, and a second source and drain metal layer, and the bonding soldering pad is connected to some of gold fingers (the second bonding terminal 211) of the printed circuit board 20 through the second source and drain metal layer by the anisotropic conductive adhesive film.

Figure 5A:
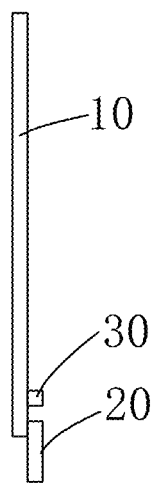
FIG. 5a is a first side view of the display device in FIG. 1.
Figure 5B:
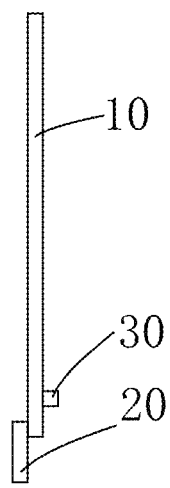
FIG. 5b is a second side view of the display device in FIG. 1.
Figure 5C:
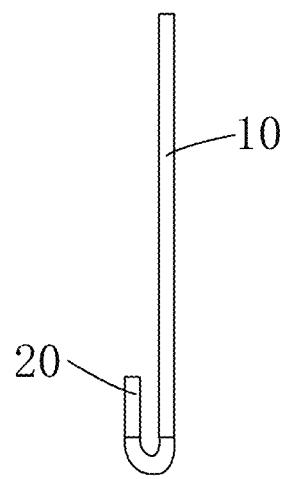
FIG. 5c is a third side view of the display device in FIG. 1.
Figure 5D:
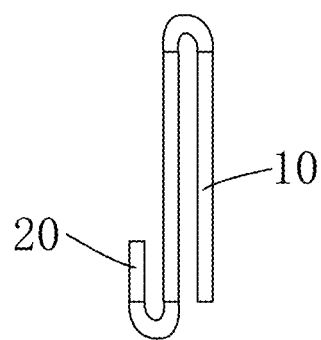
FIG. 5d is a fourth side view of the display device in FIG. 1.

With reference to FIGS. 5a to 5d, FIG. 5a is a first side view of the display device in FIG. 1; FIG. 5b is a second side view of the display device in FIG. 1; FIG. 5c is a third side view of the display device in FIG. 1; FIG. 5d is a fourth side view of the display device in FIG. 1. With reference to FIG. 5a, the first bonding terminal 111 and the driver chip 30 are disposed on the same side of the flexible substrate 12. A Terminal of the second bonding region 21 of the printed circuit board 20 is disposed to correspond to the first bonding terminal 111. With reference to FIG. 5b, the fanout wiring 40 is pulled to a rear surface of the flexible substrate 12 by a side surface wiring process, namely, the first bonding terminal 111 and the driver chip 30 are disposed on two opposite sides of the flexible substrate 12, the first bonding terminal 111 is disposed on the rear surface of the flexible substrate 12, and the second bonding terminal 211 on the printed circuit board 20 is disposed to correspond to the first bonding terminal 111. Based on the flexible substrate 12 having excellent performance of traditional polyimide, with reference to FIGS. 5c and 5d, the flexible substrate 12 is applied to a flexible display technology of a folding screen and the flexible substrate 12 has a corresponding folding state.

Figure 6:
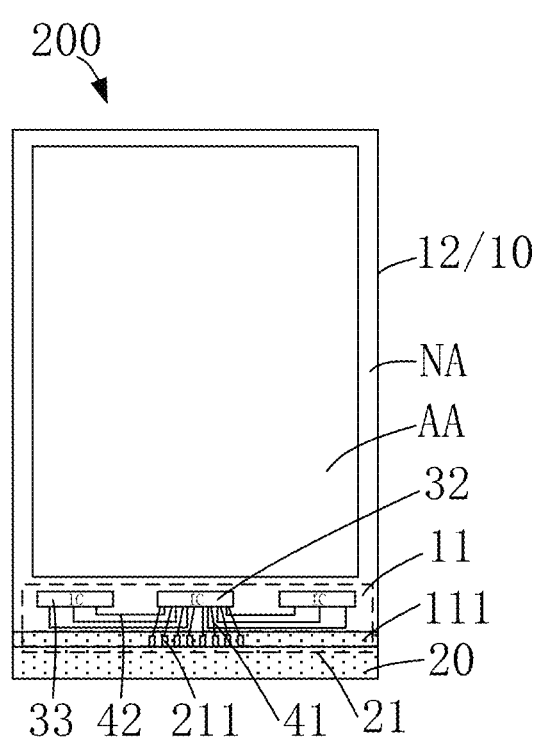
FIG. 6 is a schematic structural view of the display device provided by a second embodiment of the present application.
Figure 7:
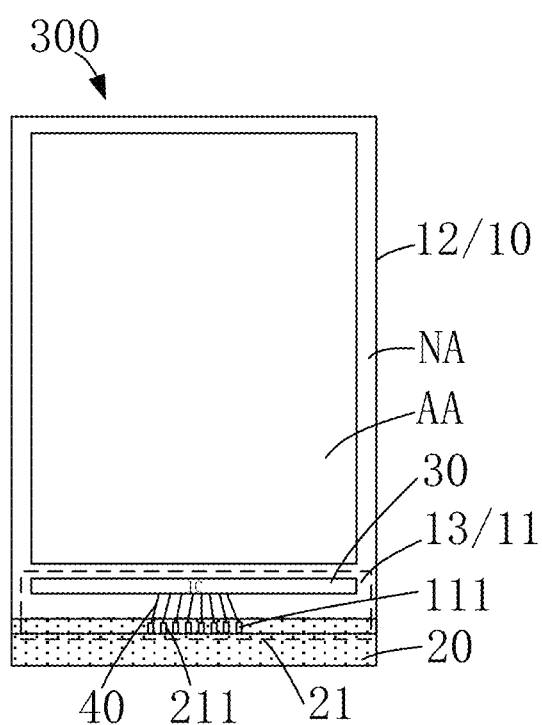
FIG. 7 is a schematic structural view of the display device provided by a third embodiment of the present application.

As a specific embodiment of the present application, with reference to FIG. 6, FIG. 6 is a schematic structural view of the display device provided by a second embodiment of the present application. With reference to FIGS. 6 and 7, the embodiment of the present application provides a display device 200, and a difference of the display device 200 from the display device 100 is that the driver module in the display device 200 comprises a first driver chip 32, a second driver chip 33, a first fanout wiring 41, and a second fanout wiring 42. An end of the first fanout wiring 41 is electrically connected to the first driver chip 32, and another end of the first fanout wiring 41 is electrically connected to the first bonding terminal 111. An end of the second fanout wiring 42 is electrically connected to the second driver chip 33, and another end of the second fanout wiring 42 is electrically connected to the first driver chip 32.

In the embodiment of the present application, a number of the fanout wirings 40 from the driver chip 30 to the flexible circuit board is reduced. In a range allowed by the resistance, one first fanout wiring 41 is electrically connected to the input end leads 31 of the driver chips 30 transmitting the same signal as possible. With reference to FIG. 6, for example, the first bonding region 11 comprises a plurality of the driver chips 30 (a number of the driver chips 30 can be adjusted according to actual demands, the present application has no limit to it) that one first fanout wiring 41 can be electrically connected to the input end leads 31 of the driver chips 30 transmitting the same signal, and the second fanout wirings 42 among the driver chips 30 for transmitting a cascade signal are connected. In particular, a jumper wiring of the first fanout wiring 41 and the second fanout wiring 42 is disposed on a first source and drain electrode metal layer. In the place of the jumping wiring of the first fanout wiring 41 and the second fanout wiring 42, a part of the corresponding first fanout wiring 41 or the corresponding second fanout wiring 42 is disposed on a gate electrode metal layer or a second source and drain electrode metal layer, and the first source and drain electrode metal layer is electrically connected to the gate electrode metal layer or second source and drain electrode metal layer by a via hole, which further reduces a number of the fanout wirings to further reduce a number of the first bonding terminals 111 and decrease an area of the first bonding region 11 to improve a bonding rate.

Figure 8:
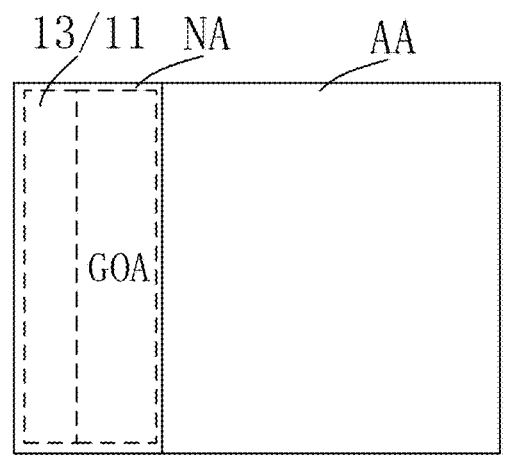
FIG. 8 is a top view of a driving functional layer provided by the embodiment of the present application.
Figure 9:
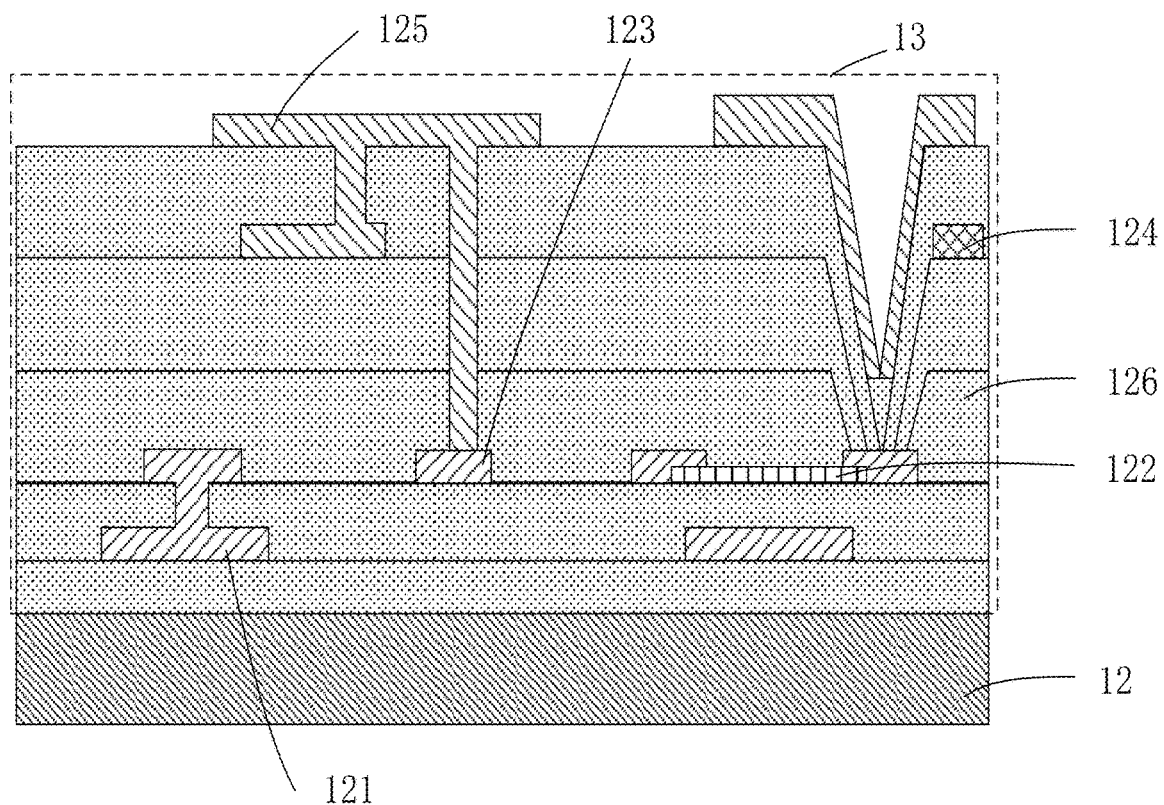
FIG. 9 is a cross-sectional view of a first bonding region in the display panel in FIG. 7.

As a specific embodiment of the present application, with reference to FIGS. 7 to 9, FIG. 7 is a schematic structural view of the display device provided by a third embodiment of the present application; FIG. 8 is a top view of a driving functional layer provided by the embodiment of the present application; and FIG. 9 is a cross-sectional view of a first bonding region in the display panel in FIG. 7. With reference to FIGS. 7 to 9, the embodiment of the present application provides a display device 300. A difference of the display device 300 from the display device 100 is that in the display device 300: In the first bonding region 11, the display panel 10 comprises a flexible substrate 12 and a driving functional layer 13. The driving functional layer 13 is disposed on the flexible substrate 12, the driving functional layer 13 is configured to receive a control signal and process and then output the control signal. The driving functional layer 13 comprises a thin film transistor 14 and a fanout wiring 40. An end of the fanout wiring 40 is electrically connected to the thin film transistor 14, and another end of the fanout wiring 40 is electrically connected to the first bonding terminal 111.

In the embodiment of the present application, with reference to FIG. 7, to further reduce a bonding area and lower the cost, some of function modules of the driver chip 30 are integrated to the flexible substrate 12 to connect with the printed circuit board 20 also by the first bonding terminal 111 on the flexible substrate 12. In particular, some basic units of the function modules of the driver chip 30 comprise shift register, latch, level shifter, decoder, digital to analog converter, amplification circuit, interface circuit, etc. ... The present application disposes the thin film transistor 14 of high mobility to achieve functions corresponding to some basic units of the function modules of the driver chip 30.

In the embodiment of the present application, a pitch P between adjacent two of the first bonding terminals 111 is greater than or equal to 250 microns. In particular, the driver circuit in the driver chip 30 is integrated on the flexible substrate 12 such that a number of the fanout wirings 40 for transmitting control signals to the driver chip 30 is decreased, a number of the corresponding first bonding terminals 111 is decreased, the pitch P among the first bonding terminals 111 is further increased, and a bonding resistance is further reduced, which facilitates further improving the bonding rate. In particular, the first bonding terminal 111 can be disposed on a front surface or a rear surface of the flexible substrate 12.

In the embodiment of the present application, the display panel 10 comprises a display region AA and a non-display region NA disposed adjacently. The first bonding region 11 is disposed in the display region AA, and/or, the first bonding region 11 is disposed in the non-display region NA. In particular, the driving functional layer 13 in the first bonding region 11 can be disposed in the display region AA, and/or, the driving functional layer 13 also can be disposed in the non-display region NA. For example, with reference to FIG. 8, the driving functional layer 13 is manufactured in the display region AA on the flexible substrate 12, and the driving functional layer 13 can comprise a gate driver circuit and a data circuit to connect with the fanout wiring 40 on the flexible substrate 12 for transmitting a gate driver signal by a substrate wiring and connect with each gate driver unit gate driver on array (GOA) by a fan-shaped wiring.

In the embodiment of the present application, with reference to FIG. 9, in the first bonding region 11, the driving functional layer 13 comprises a metal layer and an oxide layer. The oxide layer is disposed on a side of the metal layer away from the flexible substrate 12. The multiple fanout wirings 40 are disposed on the oxide layer at intervals, vertical orthographic projections of at least some of the fanout wirings 40 on the flexible substrate 12 have an overlap, and some of the fanout wirings 40 on the overlap are disposed on the metal layer.

In particular, the display panel comprises a flexible substrate 12 and a first metal layer 121, an oxide semiconductor layer 122, a second metal layer 123, a first oxide layer 124, and a second the oxide layer 125 that are sequentially disposed on the flexible substrate 12. The fanout wirings 40 are disposed on the second the oxide layer 125 at intervals and are connected to some of gold fingers (the second bonding terminal 211) of the printed circuit board 20 through the second the oxide layer 125 by an anisotropic conductive adhesive film. In particular, some of the fanout wirings 40 on jumper wirings are disposed on the second metal layer 123, and electrical connection of the second the oxide layer 125 and the second metal layer 123 is implemented by a through hole. Such design makes resistance variation caused by the fanout wiring 40 smaller.

Figure 10:
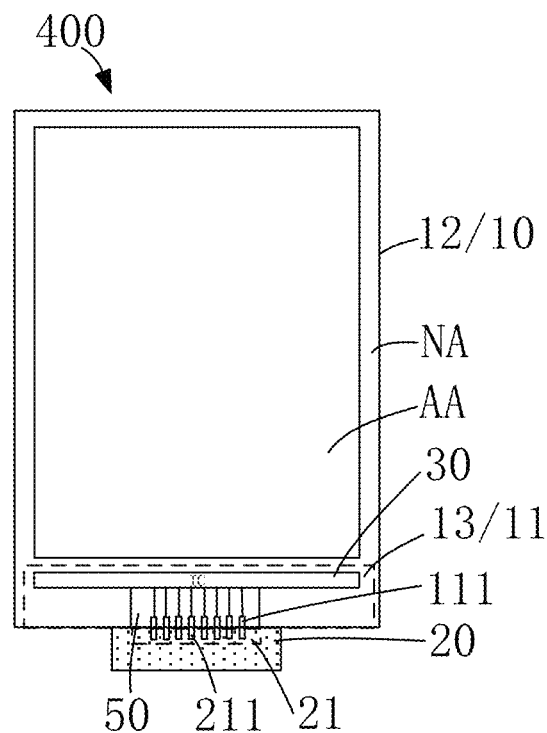
FIG. 10 is a schematic structural view of the display device provided by a fourth embodiment of the present application.
Figure 11:
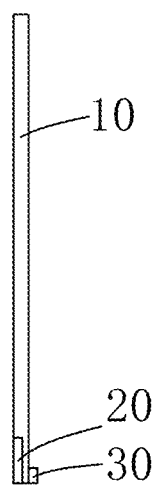
FIG. 11 is a side view of a display device provided by the fourth embodiment of the present application.
Figure 12:
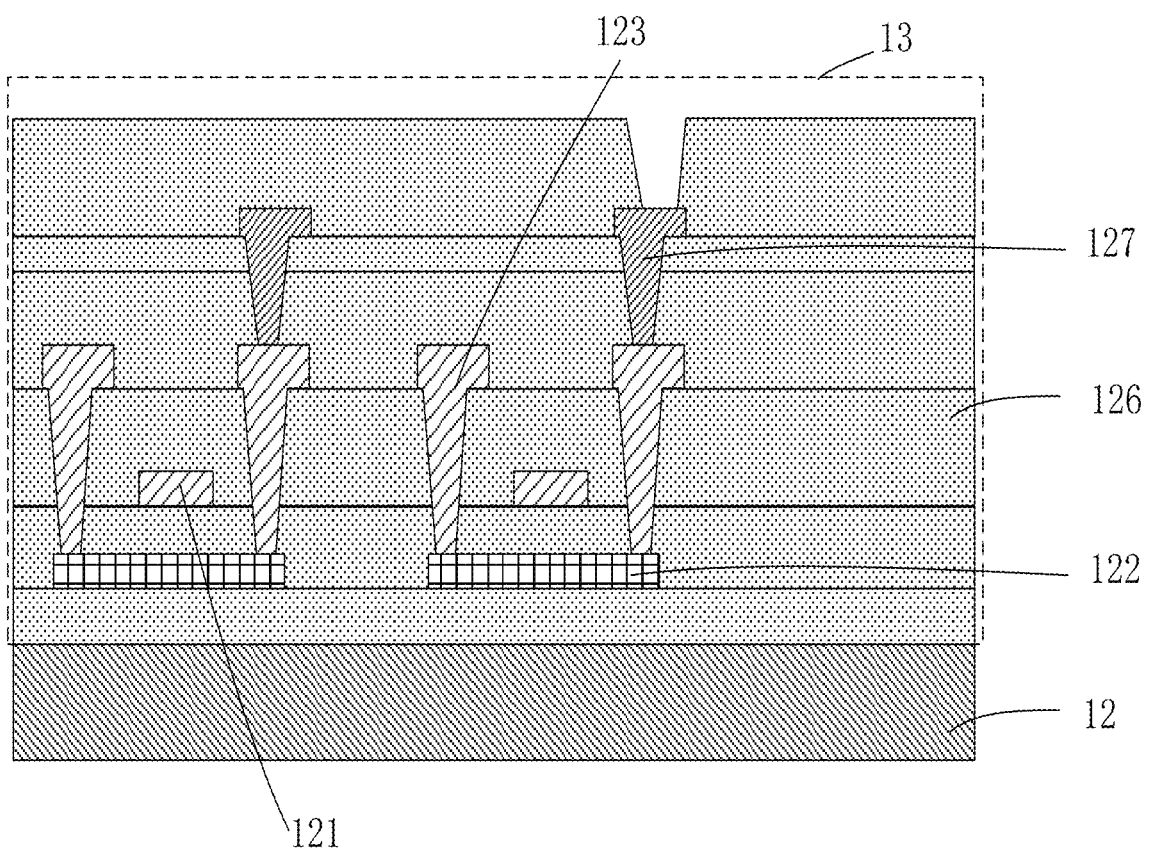
FIG. 12 is a cross-sectional view of a first bonding region of the display panel in FIG. 10.

As a specific embodiment of the present application, with reference to FIGS. 10 to 12, FIG. 10 is a schematic structural view of the display device provided by a fourth embodiment of the present application; FIG. 11 is a side view of a display device provided by the fourth embodiment of the present application; and FIG. 12 is a cross-sectional view of a first bonding region of the display panel in FIG. 10. With reference to FIG. 9, the embodiment of the present application provides a display device 400. A difference of the display device 400 from the display device 300 is that the the driving functional layer 13 of the display device 400 is further configured to generate a timing signal and a data signal according to a control signal and process and then output the timing signal and the data signal.

In the embodiment of the present application, with reference to FIG. 9, the display device 400 provided by the present application further integrates part of the driver circuit of the logic board onto the flexible substrate 12. The driver circuit of the logic board mainly includes a timing controller, a level conversion unit, a power supply, etc. By improving the exposure accuracy to enhance the mobility of the thin film transistor 14 in the driver circuit.

In the embodiment of the present application, the display device 400 further comprises a zero insertion force connector 50, the zero insertion force connector 50 is disposed on the flexible substrate 12, and the display panel 10 is electrically connected to the printed circuit board 20 through the zero insertion force connector 50. In particular, after some driver circuits of the logic board are integrated on the flexible substrate 12, only one zero insertion force (ZIF) connector 50 is required to connect with a control main board in the printed circuit board 20, which achieves minimalist application and further lowers the cost.

In the embodiment of the present application, the display device 400 further comprises a reinforcement patch 60, the reinforcement patch 60 is disposed on a side of the flexible substrate 12 away from the zero insertion force connector 50, and the reinforcement patch 60 is disposed at an end of the flexible substrate 12 near the printed circuit board 20. With reference to FIG. 10, a reinforcement patch 60 is disposed on a side of the flexible substrate 12 away from the zero insertion force connector 50, the reinforcement patch 60 is fixed by a low viscosity film. The portion of the flexible substrate 12 on the zero insertion force connector 50 is too thin and easily torn such that attaching the reinforcement patch 60 advantages reducing possibility of tearing the flexible substrate 12 and increasing connection reliability, has a simplified and compact structure, is convenient to use, has a low processing cost and a wide application range, and is safe and reliable.

In the embodiment of the present application, with reference to FIG. 11, in the first bonding region 11, the display panel comprises a flexible substrate 12 and a first metal layer 121, an oxide semiconductor layer 122, a second metal layer 123, a first oxide layer 124, and a second the oxide layer 125 that are sequentially disposed on the flexible substrate 12. The fanout wirings 40 are disposed on the second the oxide layer 125 at intervals, and are connected to some of gold fingers (the second bonding terminal 211) of the printed circuit board 20 through the second the oxide layer 125 by an anisotropic conductive adhesive film. In particular, some of the fanout wirings 40 on jumper wirings are disposed on the second metal layer 123, and electrical connection of the second the oxide layer 125 and the second metal layer 123 is implemented by a through hole. Such design makes resistance variation caused by the fanout wiring 40 smaller.

In the embodiment of the present application, with reference to FIG. 12, in an application of a sub-millimeter light emitting diode product, in the first bonding region 11, the display panel comprises a flexible substrate 12 and an oxide semiconductor layer 122, a first metal layer 121, a second metal layer 123, a third metal layer 127, and multiple interlayer dielectric layers 126 that are sequentially disposed on the flexible substrate 12. The fanout wirings 40 are disposed on the third metal layer 127 at intervals and are connected to some of gold fingers (the second bonding terminal 211) of the printed circuit board 20 through the third metal layer 127 by an anisotropic conductive adhesive film. In particular, some of the fanout wiring 40 on jumper wirings are disposed on the second metal layer 123, and electrical connection of the third metal layer 127 and the second metal layer 123 is implemented by a through hole. Such design makes resistance variation caused by the fanout wiring 40 smaller.

The present application provides a display device. The display device comprises: a display panel 10 and a printed circuit board 20. A first bonding region 11 is disposed on the display panel 10. The first bonding region 11 comprises a first bonding terminal 111. A second bonding region 21 is disposed on the printed circuit board 20. The second bonding region 21 comprises a second bonding terminal 211. The first bonding terminal 111 is connected to and contacts the second bonding terminal 211. Compared to the conventional technology requiring a flexible circuit board disposed between the display panel 10 and the printed circuit board 20, the display panel 10 in the display device provided by the present application is connected to and contacts the printed circuit board 20 through the first bonding terminal 111 and the second bonding terminal 211, which can reduce a width of a frame of the display device and improve a screen ratio of the display device.

The display device provided by the embodiment of the present application is described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A display device, comprising:
   a display panel, wherein a first bonding region, disposed on the display panel, comprises a first bonding terminal; and
   a printed circuit board, wherein a second bonding region, disposed on the printed circuit board, comprises a second bonding terminal connected to and contacting the first bonding terminal;
   wherein in the first bonding region, the display panel comprises a flexible substrate and a driving functional layer thereon; the driving functional layer that is configured to receive and process a control signal and driving functional comprises a thin film transistor and a fanout wiring electrically connected between the thin film transistor and the first bonding terminal.

2. The display device according to claim 1, wherein the display panel comprises a non-display region in which the first bonding region is disposed; the first bonding region further comprises a driver module that is electrically connected to the first bonding terminal, and is configured to receive and process a control signal.

3. The display device according to claim 2, wherein the driver module comprises a driver chip and a fanout wiring coupled between the driver chip and the first bonding terminal.

4. The display device according to claim 2, wherein the driver module comprises a first driver chip, a second driver chip, and a first fanout wiring and second fanout wiring; the first fanout wiring is electrically connected between the first driver chip and the first bonding terminal; the second fanout wiring is electrically connected between the second driver chip and the first driver chip.

5. The display device according to claim 1, wherein the driving functional layer comprises a metal layer and an oxide layer disposed on a side of the metal layer away from the flexible substrate; a plurality of the fanout wirings are disposed on the oxide layer at intervals, orthographic projections of at least some of the fanout wirings on the flexible comprise an overlap, and some of the fanout wirings on the overlap are disposed on the metal layer.

6. The display device according to claim 1, wherein the display panel comprises a display region and a non-display region disposed adjacently, the first bonding region is disposed in the display region, and/or, and the first bonding region is disposed on the non-display region.

7. The display device according to claim 1, wherein the first bonding region comprises a plurality of first bonding terminals, and a pitch between adjacent two of the first bonding terminals is greater than or equal to 250 microns.

8. The display device according to claim 1, wherein the driving functional layer is further configured to generate and process a timing signal and data signal according to the control signal.

9. The display device according to claim 8, wherein the display device further comprises zero insertion force connector disposed on the flexible substrate, and the display panel is electrically connected to the printed circuit board through the zero insertion force connector.

10. The display device according to claim 9, wherein the display device further comprises reinforcement patch disposed on the flexible substrate away from the zero insertion force connector, and disposed on the flexible substrate near the printed circuit board.

11. A display device, comprising:
    a display panel, wherein a first bonding region disposed on the display panel comprises a plurality of first bonding terminals, and a pitch between adjacent two of the first bonding terminals is greater than 120 microns; and
    a printed circuit board, wherein a second bonding region disposed on the printed circuit board comprises a plurality of second bonding terminals connected to and contacting the first bonding terminal;
    wherein in the first bonding region, the display panel comprises a flexible substrate and a driving functional layer thereon; the driving functional layer that is configured to receive and process a control signal and driving functional comprises a thin film transistor and a fanout wiring electrically connected between the thin film transistor and the first bonding terminal.

12. The display device according to claim 11, wherein the display panel comprises a non-display region in which the first bonding region is disposed; the first bonding region further comprises a driver module that is electrically connected to the first bonding terminal, and is configured to receive and process a control signal.

13. The display device according to claim 12, wherein the driver module comprises a driver chip and a fanout wiring coupled between the driver chip and the first bonding terminal.

14. The display device according to claim 12, wherein the driver module comprises a first driver chip, a second driver chip, and a first fanout wiring and second fanout wiring; the first fanout wiring is electrically connected between the first driver chip and the first bonding terminal; the second fanout wiring is electrically connected between the second driver chip and the first driver chip.

15. The display device according to claim 11, wherein the driving functional layer comprises a metal layer and an oxide layer disposed on a side of the metal layer away from the flexible substrate; a plurality of the fanout wirings are disposed on the oxide layer at intervals, orthographic projections of at least some of the fanout wirings on the flexible comprise an overlap, and some of the fanout wirings on the overlap are disposed on the metal layer.

16. The display device according to claim 11, wherein the display panel comprises a display region and a non-display region disposed adjacently, the first bonding region is disposed in the display region, and/or, and the first bonding region is disposed on the non-display region.

17. The display device according to claim 11, wherein the first bonding region comprises a plurality of first bonding terminals, and a pitch between adjacent two of the first bonding terminals is greater than or equal to 250 microns.

18. The display device according to claim 11, wherein the driving functional layer is further configured to generate and process a timing signal and data signal according to the control signal.

* * * * *